May 29, 1962
C. D. WOOD ET AL
3,036,457
LEAK DETECTOR
Filed July 19, 1960
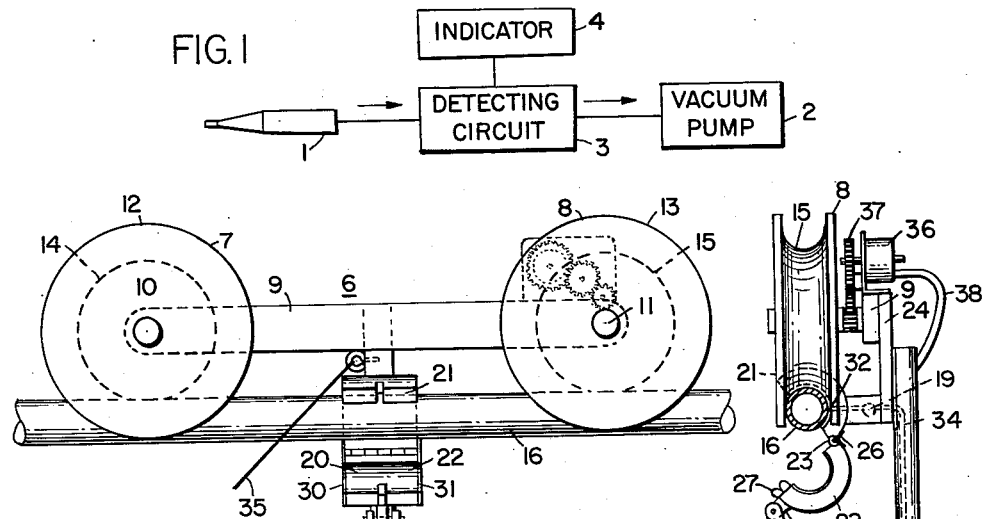
FIG. 1
FIG. 2
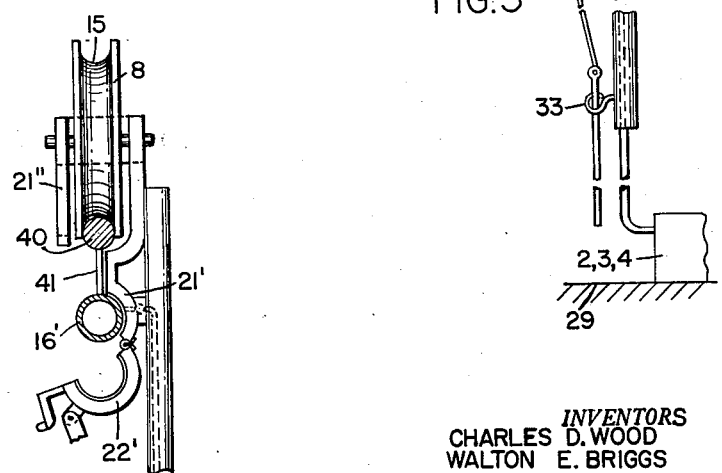
FIG. 3
FIG. 4
INVENTORS
CHARLES D. WOOD
WALTON E. BRIGGS
BY
Irving M. Freedman
THEIR ATTORNEY

United States Patent Office 3,036,457
Patented May 29, 1962

3,036,457
LEAK DETECTOR
Charles D. Wood, Richmond, Va., and Walton E. Briggs, Lynnfield Center, Mass., assignors to General Electric Company, a corporation of New York
Filed July 19, 1960, Ser. No. 43,761
8 Claims. (Cl. 73—40.5)

The subject invention relates to a leak detector probe assembly, and more particularly to an improved probe assembly suitable for use in detecting leaks in conduits such as gas-filled telephone cables.

Conduits, which are sealed relative to the general atmosphere, are extensively used to protect wires, cables and other material from the effects of the atmosphere. In order to protect the interior material from moisture and other effects of the atmosphere, the cables are generally pressurized with dry air or some inert gas. It therefore becomes necessary to detect and correct leaks in the conduit to prevent the escape of the pressurized gas and/or the introduction of the general atmosphere to the interior of the cable.

The problem of detecting leaks in conduits, such as aerial telephone transmission cable, has not been satisfactorily solved by prior art devices for a variety of reasons. Leak detectors for such cables should be relatively light weight and should be adapted to be hooked over the cable and pulled along the span searching for leaks at a relatively rapid rate. Furthermore, the leak detector should be remotely operated from the ground since it is not feasible for the operator to be supported alongside the conduit during the testing operation. Furthermore, since such cables are often out of doors, the equipment must be suitable for locating leaks under varying weather conditions such as wind, snow or rain. A consideration of the above requirements will indicate that methods which are used such as immersing sections of the cable in a soap bath to detect leaks through bubbles formed in the bath are unsuitable for inspection of cables which may be many miles long.

It is an object of this invention to provide an improved leak detector probe which may be readily hooked over a telephone or other aerial cable and pulled along the span searching for leaks.

It is another object of this invention to provide an improved leak detector probe which is light weight and adapted to probe outdoor conduits under varying weather conditions.

It is still another object of this invention to provide an improved leak detector probe which may be remotely operated from the ground to probe aerial cables.

It is still another object of this invention to provide an improved, low-cost leak detector probe suitable for probing tubular conduits and for connection of a leak detector to such a probe.

Further objects and advantages of this invention will become apparent as the following description proceeds and the features of novelty which characterize the invention will be pointed out with particularity in the claims annexed to and forming a part of this specification.

In accordance with one form of the invention, a leak detector probe assembly is provided which is suitable for use in detecting leaks in a conduit containing a tracer gas to which the leak detector is responsive. The probe is adapted to be detachably mounted on the conduit and to substantially surround and conform to the contour of the conduit. At least one orifice leads from the probe through connecting tubing to the leak detector tracer gas responsive means. Means are provided to support the probe in operative relationship to the conduit and to move the support means and the probe relative to the conduit during the probing operation. A vacuum pump draws samples of the atmosphere around the conduit and within the probe to the leak detector located on the ground in order to provide an indication of the presence of the tracer gas and thus an indication of a leak.

More particularly, the probe is supported by a carriage assembly which is adapted to move along the conduit at a uniform speed and which, along with the probe, is connected to a pole or rod such that the entire assembly may be hooked over an aerial cable from the ground. The probe comprises a split ring, the opening and closing of which may be remotely controlled from the ground, in order to detachably mount the probe around the conduit.

For a better understanding of the invention, reference may be had to the following specification taken in conjunction with the accompanying drawings in which:

FIG. 1 is a schematic showing in block diagram form of a leak detector system incorporating the invention;

FIG. 2 is the front view of a leak detector probe constructed in accordance with the subject invention and shown mounted upon an aerial cable;

FIG. 3 is a side view of the probe shown in FIG. 2; and

FIG. 4 is a modification of a portion of the probe shown in FIGS. 2 and 3.

Referring to FIG. 1, a leak detector system with which the subject invention may be utilized is shown, and includes a probe assembly 1 which is shown in more detail in FIGS. 2 and 3. Samples of the atmosphere from within the area surrounded by the probe 1 are drawn by the vacuum pump 2 to the detecting circuit 3. Detecting circuit 3 includes a vapor detector, the ionization of which varies in accordance with the concentration of certain gases or vapors introduced thereto. Variations of ionization are reflected in variations of current flow and an increase of current flow is utilized to indicate the presence of a leak on indicator 4. The detecting circuit and theory of operation of the leak detector are described in more detail in U.S. Patent 2,550,498 granted April 24, 1951, on application Ser. No. 754,657, filed June 14, 1947, by Chester W. Rice and assigned to the same assignee as the present application.

The details of the improved probe assembly 1, as constructed in accordance with the subject invention, are shown in FIGS. 2 and 3. Referring to those figures, the probe 1 includes a carriage 6 comprising a pair of wheels 7 and 8 separated by connecting member 9 and rotatably mounted upon axles 10 and 11. The end surfaces 12 and 13 of wheels 7 and 8, respectively, include V-shaped or semicircular grooves 14 and 15, respectively, the dimensions of which are adapted to co-operate with the exterior surfaces of the aerial conduit assembly 16 upon which the carriage 6 rides. The probe 20 is suspended from the connecting member 9 intermediate the wheels 7 and 8 and comprises a pair of semicircular sleeve members 21 and 22 pivotally connected at hinge 23 and adapted to substantially surround the conduit 16 when in the closed position. The upper sleeve member 21 is supported by the connecting member 9 by support member 24.

An electrically insulating tubular pole member 28 is rigidly connected to support member 24 and is of a sufficient length to extend from the probe assembly to the operator and part or all of the leak detector detecting and control circuitry on the ground 29. The lower sleeve member 22 may be remotely operated by a line or rod 25 connected thereto by coupling 18. In the preferred embodiment, the sleeve members 21 and 22 are normally urged together by a spring 26 associated with hinge 23. The sleeve members may be opened to hook the probe around the conduit 16 by a force exerted on the line 25 and the spring 26 will urge the sleeve member 22 into contact with the bottom surface of the conduit upon release of the force. Alternatively, through use of a rigid rod 25 and a latch mechanism 27, the sleeve members 21 and 22 may be selectively, mechanically secured about the conduit 16.

Thin neoprene diaphragms 30 and 31 are affixed to the ends of the sleeve members 21 and 22 which are transverse to the axis of the conduit 16 to isolate the pickup from atmospheric conditions such as wind. The enclosure formed between the diaphragms and the sleeve members is connected by way of one or more orifices 32 to the tube or passageway 34 which passes through the support member 24 and pole 28 to the sensitive element associated with the detecting circuit of the leak detector. The sensitive element may be mounted on the carriage 6 in order to minimize the response time required between the time the probe passes over a leak and the tracer gas reaches the sensitive element to provide a leak indication. However, location of the sensitive element on the probe assembly, such as at 19, requires electrical leads leading from the detecting circuitry on the ground through or along the pole 28 to the sensitive element.

Line or rod 25 may be conveniently passed through one or more eyelets such as 33 secured to the rod 28.

In operation, the probe may be secured about the conduit as follows, the sleeve members 21 and 22 are separated through actuation of the rod 25 and the probe is hooked over the conduit 16 by means of pole 28 so that the lower portions of the grooves 14 and 15 of wheels 7 and 8 and the interior of the upper sleeve member 21 rest upon the conduit. The rod 25 is then actuated to close or clamp the lower sleeve member 22 about the under surface of the conduit. The tracer gas to which the leak detector is responsive, and which is not injurious to the contents of the conduit, is introduced to the interior of the cable and the probe is moved along the conduit with the vacuum pump 2 drawing samples of the atmosphere surrounding the conduit at the probe assembly to the detecting circuit of the leak detector. The presence of a leak is indicated when the probe passes over a leak and the tracer gas is drawn through the orifice 32 to the detecting circuit.

Movement of the probe along the conduit may be conveniently accomplished from the ground through use of a tow line 35 secured to the probe. Since the smallest leak which can be detected is dependent upon the concentration of the tracer gas and upon the speed of the probe along the conduit, it may be desirable to provide a constant speed drive to insure that the maximum desired speed is not exceeded. A governor or a constant speed electrical motor 36 may be connected through gearing 37 to the shaft or axle 11 of the wheel 8. The use of an electric motor will require a source of electrical energy such as batteries associated with the probe or electrical leads 38 passing through the pole 28 to the equipment on the ground.

The speed of travel of the probe 6 along the conduit 16 may be, for example, 2 inches per second. Since there is a short response time required for the tracer gas to pass through passageway 34 to the detecting circuit, the leak may be centralized upon a leak indication by stopping the movement of the probe and then slowly reversing the direction of movement until the leak detector indicates the exact spot where the tracer gas occurs.

FIG. 4 illustrates a modification of the probe in situations where the conduit assembly to be tested includes the conduit 16' suspended below a lead or guy wire 40 by a plurality of spaced support wires 41. Under such circumstances, the wheels 7 and 8 ride upon the guy wire 40 and the upper sleeve is fabricated in two parts 21' and 21" so as to extend around and below the support wires 41 to contact a portion of the upper surface of the conduit 16'. The lower sleeve 22' may then be selectively controlled to surround the lower surface of the conduit 16' and to substantially surround a portion of the conduit in co-operation with the upper sleeve.

Therefore, while particular embodiments of the subject invention have been shown and described herein, they are in the nature of description rather than limitation, and it will occur to those skilled in the art that various changes, modifications, and combinations may be made within the province of the appended claims without departing either in spirit or scope from this invention in its broader aspects.

What we claim as new and desire to secure by Letters Patent of the United States is:

1. A leak detector probe assembly suitable for use in detecting from the ground leaks in an aerial conduit containing a tracer gas to which the leak detector is responsive comprising: a probe including a pair of relatively movable sleeve members adapted to substantially surround and conform to the contour of a portion of said conduit, the movement of said sleeve members being remotely controlled from the ground, at least one orifice in said probe to connect said probe to the leak detector tracer gas responsive means, means to support said probe in operative relationship to said conduit, means interconnecting said probe and said leak detector to enable the positioning of the leak detector on the ground, and means controllable from the ground to move said support means and probe relative to said conduit.

2. A leak detector probe assembly suitable for use in detecting from the ground leaks in an aerial conduit containing a tracer gas to which the leak detector is responsive comprising: a probe including a pair of relatively movable sleeve members adapted to substantially surround and conform to the contour of a portion of said conduit, the movement of said sleeve members being remotely controlled from the ground, at least one orifice in said probe to connect said probe to the leak detector tracer gas responsive means, means to support said probe in operative relationship to said conduit, said support means including at least one rotatably mounted wheel which is adapted to roll along the conduit assembly, means interconnecting said probe and said leak detector to enable the positioning of the leak detector on the ground, and means controllable from the ground to move said support means and probe relative to said conduit.

3. A leak detector probe assembly suitable for use in detecting from the ground leaks in an aerial conduit containing a tracer gas to which the leak detector is responsive comprising: a probe including a pair of hinged sleeve members adapted to substantially surround and conform to the contour of a portion of said conduit, the movement of said hinged sleeve members being remotely controlled from the ground, at least one orifice in said probe to connect said probe to the leak detector tracer gas responsive means, means to support said probe in operative relationship to said conduit, said support means including at least one rotatably mounted wheel which is adapted to roll along the conduit assembly, means interconnecting said probe and said leak detector to enable the positioning of the leak detector on the ground, and means controllable from the ground to move said support means and probe relative to said conduit whereby said probe assembly may be selectively hooked around, supported by, and moved along said conduit assembly.

4. A leak detector hook-on probe assembly suitable for use in detecting from the ground leaks in an aerial conduit comprising: a probe including a pair of hinged sleeve members adapted to substantially surround and conform to the contour of a portion of said conduit, the movement of said hinged sleeve members being remotely controlled from the ground, at least one orifice in said probe to connect said probe to the leak detector tracer gas responsive means, means to support said probe in operative relationship to said conduit, said support means including at least one rotatably mounted wheel which is adapted to roll along the conduit assembly, means interconnecting said probe and said leak detector to enable the positioning of the leak detector on the ground, and means controllable from the ground to move said support means and probe at a substantially constant speed relative to said conduit whereby said probe assembly may be selectively hooked around, supported by, and moved along said conduit assembly to probe for leaks in said conduit.

5. A leak detector probe assembly suitable for use in detecting leaks in a conduit containing a tracer gas to which the leak detector is responsive comprising: a pair of spring loaded, hinged sleeve members adapted to substantially surround and conform to the contour of said conduit when in their operative position, a control mechanism to control the relative movement of said sleeve members, a gasket to assist in isolating the space between said sleeve members and said conduit from the effects of the atmosphere surrounding the probe, at least one orifice in said probe to connect said probe to the leak detector tracer gas responsive means element, and means to support and move said probe in operative relationship relative to said conduit.

6. A leak detector probe assembly suitable for use in detecting leaks in a conduit containing a small percentage of tracer gas to which the leak detector is responsive comprising: a pair of spring loaded, hinged sleeve members adapted to substantially surround and conform to the contour of said conduit when in their operative position, a control mechanism to control the relative movement of said sleeve members, a gasket to assist in isolating the space between said sleeve members and said conduit from the effects of the atmosphere surrounding the probe, at least one orifice in said probe to connect said probe to the leak detector tracer gas responsive means, and means to support and move said probe at a substantially constant speed in operative relationship relative to said conduit.

7. A leak detector probe assembly suitable for use in detecting leaks in a conduit containing a tracer gas to which the leak detector is responsive comprising: a pair of hinged sleeve members adapted to substantially surround and conform to the contour of said conduit when in their operative position, a control mechanism to control the relative movement of said sleeve members, sealing means to assist in isolating the space between said sleeve members and said conduit from the effects of the atmosphere surrounding the probe, at least one orifice in said probe to connect said probe to the leak detector tracer gas responsive means, means to support and move said probe in operative relationship relative to said conduit, and an elongated handle extending from the probe having said control mechanism associated therewith to facilitate attaching the probe to an elevated cable from the ground.

8. A leak detector probe assembly suitable for use in detecting leaks in a conduit containing a tracer gas to which the leak detector is responsive comprising: a pair of hinged sleeve members adapted to substantially surround and conform to the contour of said conduit when in their operative position, a control mechanism to control the relative movement of said sleeve members, sealing means to assist in isolating the space between said sleeve members and said conduit from the effects of the atmosphere surrounding the probe, at least one orifice in said probe to connect said probe to the leak detector tracer gas responsive means element, means to support and move said probe in operative relationship relative to said conduit, and an elongated handle extending from the probe having said control mechanism associated therewith to facilitate attaching the probe to an elevated cable from the ground, said handle including a gas passageway intermediate said orifice and said tracer gas responsive means.

References Cited in the file of this patent

UNITED STATES PATENTS 2,518,327    Jahn                    Aug. 8, 1950

FOREIGN PATENTS 669,125    Germany               Dec. 17, 1938
542,164    Great Britain           Dec. 30, 1941